United States Patent
Lee et al.

(10) Patent No.: US 10,502,587 B2
(45) Date of Patent: Dec. 10, 2019

(54) SHIFTING-RANGE ROTARY SENSOR UNIT FOR A VEHICLE

(71) Applicant: LS AUTOMOTIVE CORP, Ansan-si, Gyeonggi-do (KR)

(72) Inventors: Won Lee, Siheung-si (KR); In Chul Hwang, Bucheon-si (KR)

(73) Assignee: LS AUTOMOTIVE TECHNOLOGIES CO., LTD., Anyang-si, Gyeonggi-do (KR)

( * ) Notice: Subject to any disclaimer, the term of this patent is extended or adjusted under 35 U.S.C. 154(b) by 224 days.

(21) Appl. No.: 15/786,636

(22) Filed: Oct. 18, 2017

(65) Prior Publication Data

US 2018/0113000 A1 Apr. 26, 2018

(30) Foreign Application Priority Data

Oct. 20, 2016 (KR) .......................... 10-2016-136459

(51) Int. Cl.
*G01D 5/12* (2006.01)
*F16H 59/02* (2006.01)
(Continued)

(52) U.S. Cl.
CPC ............. *G01D 5/125* (2013.01); *F16H 59/02* (2013.01); *F16H 59/08* (2013.01); *F16H 59/105* (2013.01);
(Continued)

(58) Field of Classification Search
CPC .......... G01D 5/125; G01D 5/04; G01D 5/145; F16H 59/02; F16H 59/08; F16H 59/105; F16H 2059/0221
See application file for complete search history.

(56) References Cited

U.S. PATENT DOCUMENTS 7,482,801 B2 *  1/2009  Bolton ................. F16H 59/105
                                        324/207.24
7,621,198 B2 * 11/2009  Kako .................. F16H 59/0278
                                        116/28.1
(Continued)

FOREIGN PATENT DOCUMENTS

JP    2016-109292 A    6/2016
KR    2010-0083983 A   7/2010
(Continued)

*Primary Examiner* — Faye M Fleming
(74) *Attorney, Agent, or Firm* — Rabin & Berdo, P.C.

(57) ABSTRACT

The present invention provides a shifting range rotary sensing device for a vehicle, comprising: a housing; a substrate accommodated and disposed in the housing; a rotary hinge rod rotatably disposed within the housing and contactingly connected to a lever cooperating unit operated in cooperation with a vehicle gearshift lever so that the rotary hinge rod is rotated cooperatively with the vehicle gearshift lever when the vehicle gearshift lever is rotated; a sensing unit comprising a magnetic sensor disposed on the substrate and a magnet disposed at the rotary hinge rod to correspond to the magnetic sensor; and a rotary hinge rod torsion unit disposed within the housing in a manner to be supportingly contacted at one end thereof with the rotary hinge rod and at the other end thereof with the inside of the housing to elastically support the rotary hinge rod when the rotary hinge rod is rotated.

10 Claims, 18 Drawing Sheets

(51) Int. Cl.
  *G01D 5/04* (2006.01)
  *F16H 59/08* (2006.01)
  *G01D 5/14* (2006.01)
  *F16H 59/10* (2006.01)

(52) U.S. Cl.
  CPC ............... *G01D 5/04* (2013.01); *G01D 5/145* (2013.01); *F16H 2059/026* (2013.01); *F16H 2059/0221* (2013.01)

(56) References Cited

U.S. PATENT DOCUMENTS

| | | | |
|---|---|---|---|
| 9,127,761 B2 * | 9/2015 | Sasaki | F16H 59/02 |
| 10,372,153 B2 * | 8/2019 | Nakano | F16H 61/24 |
| 2005/0235771 A1 * | 10/2005 | Yokoyama | F16H 59/0204 |
| | | | 74/473.33 |
| 2010/0256880 A1 * | 10/2010 | Sato | F16H 59/105 |
| | | | 701/55 |

FOREIGN PATENT DOCUMENTS

| KR | 2011-0062335 A | 6/2011 |
|---|---|---|
| KR | 2012-0033817 A | 4/2012 |
| KR | 10-1375780 B1 | 3/2014 |

\* cited by examiner

| LEVER position | P(0 reference) α1 | R(0 reference) α2 | Before mounting α3 | N(0 reference) α4 | D α5 |
|---|---|---|---|---|---|
| Configuration of motion | 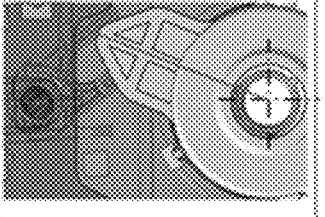 | 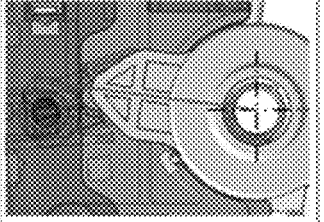 | 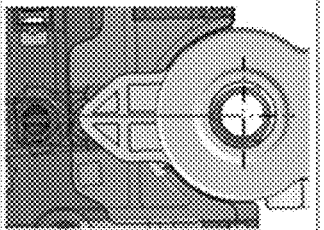 | 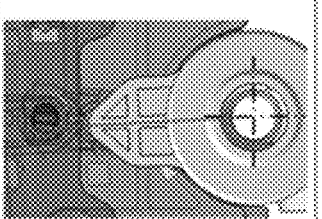 | 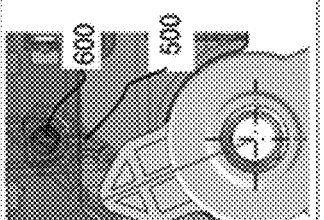 |
| Magnetic sensor (430) – Magnet (600) | | | | | |
| Magnet rotation angle | Reference before mounting CW β1 | Reference before mounting CW β2 | Before mounting β3 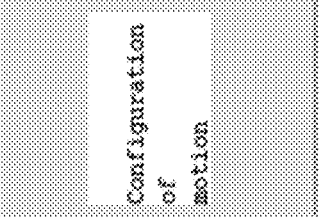 | Reference before mounting CCW β4 | Reference before mounting CCW β5 |
| Sensor output angle | γ1 | γ2 | γ3 90deg | γ4 | γ5 |
FIG. 14

SHIFTING-RANGE ROTARY SENSOR UNIT FOR A VEHICLE

CROSS-REFERENCE TO RELATED APPLICATIONS

This application claims the benefit of Korean Patent Application No. 10-2016-0136459, filed on Oct. 20, 2016 in the Korean Intellectual Property Office, which is incorporated herein by reference in its entirety.

FIELD OF THE INVENTION

The present invention relates to a device for detecting the position of a gearshift lever for a vehicle, which has a hysteresis reduction structure, and more particularly, to a shifting range rotary sensing device for a vehicle, in which a magnetic sensor is disposed on a corresponding side of a component including a permanent magnet, which is operated in cooperation with a gearshift lever such that the range rotary sensing device is operated in a more precise and safe manner than a conventional device by applying a torsion coil spring to improve assembability.

DESCRIPTION OF RELATED ART

A conventional gearshift lever for a vehicle is constructed in a complicated configuration in which it can be operated in cooperation with a component including a permanent magnet so that a lever operation by a user is converted into a stereotyped operation of the permanent magnet, and a plurality of magnetic sensors is disposed to detect such conversion. In addition, a certain tolerance and a clearance gap for the purpose of assembly with the component make difficult the accurate detection of the gearshift lever due to an error caused by an operation smaller than the operation range of the lever.

In FIG. 1, there is shown a gearshift sensor according to the prior art. As shown in FIG. 1, the gearshift sensor has a structure in which it includes a hinge rod configured to detect a gearshift position according to the manipulation position of a lever through the cooperative operation the lever, and a magnetic sensor disposed on a corresponding side of a permanent magnet as many as the number of detections of the gearshift position. However, the conventional gearshift sensor entails a problem in that an error is involved upon the detection of a shifting range due to an assembly tolerance required for assembly between the lever and the hinge rod, thus making it difficult to detect a precise gearshift position corresponding to the operation of the lever. In addition, the hinge rod is not maintained in a fixed state during the assembly of the gearshift lever and the hinge rod, and thus assemblability is degraded so that considerable time is spent on the assembly process and the permanent magnet is not positioned ate the center of a rotary shaft, thus leading to an increase in the number of the magnetic sensors installed as well as the manufacturing cost.

SUMMARY OF THE INVENTION

Accordingly, the present invention has been made to solve the above-mentioned problems occurring in the prior art, and it is an object of the present invention to provide a shifting range rotary sensing device for a vehicle, which reduces hysteresis occurring in an assembly tolerance between the above-described cooperatively operating components through a simple structure to enable a more accurate rotation detection and improve assemblability.

Another object of the present invention is to provide a shifting range rotary sensing device for a vehicle, in which the assembly direction and position is always maintained constantly through a rotary hinge rod torsion unit employing a torsion coil spring of a simple structure to improve assemblability, and thus a hinge rod cooperating with a gearshift lever is securely operated, thereby minimizing an error due to a clearance gap pointed out as the above-described problem to enable an accurate rotation detection, and in which a permanent magnet is disposed at the center of a rotary shaft so that the position of the lever over the entire section can be detected using a single permanent magnet.

To achieve the above object, the present invention provides a shifting range rotary sensing device for a vehicle, including: a housing (100, 800); a substrate 400 accommodated and disposed in the housing (100, 800); a rotary hinge rod 500 rotatably disposed within the housing (100, 800) and contactingly connected to a lever cooperating unit 20 operated in cooperation with a vehicle gearshift lever 30 so that the rotary hinge rod 500 is rotated cooperatively with the vehicle gearshift lever 30 when the vehicle gearshift lever 30 is rotated; a sensing unit (430, 600) comprising a magnetic sensor 430 disposed on the substrate 400 and a magnet 600 disposed at the rotary hinge rod 500 to correspond to the magnetic sensor 430; and a rotary hinge rod torsion unit 700 disposed within the housing (100, 800) in such a manner as to be supportingly contacted at one end thereof with the rotary hinge rod 500 and at the other end thereof with the inside of the housing (100, 800) so as to elastically support the rotary hinge rod 500 when the rotary hinge rod 500 is rotated.

In the shifting range rotary sensing device, the housing (100, 800) may include: a housing body 100 disposed in the vehicle; and a housing cover 800 engagingly coupled to the housing body 100, wherein the housing cover 800 may have a cover opening part 801 formed thereon, and wherein the rotary hinge rod 500 may be exposed to the outside through the cover opening part 801 so as to be connected to the lever cooperating unit 20.

In the shifting range rotary sensing device, the lever cooperating unit 20 may include a cooperating rib 21 extending downwardly from one side thereof. The rotary hinge rod 500 may include: a hinge rod mounting part 530 rotatably engaged to a housing cover rod mounting part 820 formed at the housing cover 800; a hinge rod body 501 connected to the hinge rod mounting part 530; and a hinge rod extension part 503 extending downwardly from the hinge rod body 501 and including a hinge rod rib insertion part 510 defined therebetween to accommodate the cooperating rib 21 therein.

In the shifting range rotary sensing device, the hinge rod body 501 may include a rod body magnet accommodating part 502 formed therein to allow the magnet 600 to be accommodated therein.

In the shifting range rotary sensing device, the sensing unit may detects a preset shifting range including one or more of P(parking), D(driving), R(rearward moving), and N(neutral shifting) of the vehicle, and a buffer range may be provided between at least two adjacent shifting ranges of the preset shifting range.

In the shifting range rotary sensing device, the rotary hinge rod torsion unit 700 may be implemented as a torsion spring.

In the shifting range rotary sensing device, the rotary hinge rod torsion unit 700 may include: a torsion coil part 710 configured to allow the hinge rod mounting part 530 to penetrate therethrough; a torsion coil rod support part 720 supported by a hinge rod torsion support part 520 extending from the hinge rod body 501 at its one end connected to the torsion coil part 710; and a torsion coil cover support part 730 supported by a cover torsion support part 810 extending from the housing cover 800 at its the other end connected to the torsion coil part 710.

In the shifting range rotary sensing device, the hinge rod torsion support part 520 may include a hinge rod torsion support groove 521 formed thereon to allow the torsion coil rod support part 720 to be insertingly disposed therein, and the cover torsion support part 810 may include a cover torsion support groove 811 formed thereon to allow the torsion coil cover support part 730 to be insertingly disposed therein.

In the shifting range rotary sensing device, the substrate 400 may include a through-hole 401 formed therein, and the housing body 100 may include a support rib 110 extending protruding from one side of the hinge rod body 501 to an opposing side of the hinge rod mounting part 530 while penetrating through the through-hole 401 to maintain a gap between the hinge rod body 501 and the substrate 400.

In the shifting range rotary sensing device, the shifting range rotary sensing device may further include a driving mode switch 900 disposed on the substrate 400 and configured to allow a user to select a driving mode of the vehicle through its manipulation by the user.

The shifting range rotary sensing device according to the embodiments of the present invention as constructed above have the following advantageous effects.

A vehicle gearshift lever and a lever cooperating unit can minimize an assembly tolerance to enable a more accurate detection of gearshift position and shifting range.

The elastic support of the lever cooperating unit by a rotary hinge rod torsion unit can improve assemblability during the assembly of the vehicle gearshift lever and the lever cooperating unit.

A rod body magnet accommodating part 502 is formed at the rotational center of the lever cooperating unit to enable a gearshift state detection over the entire section range using a single magnet sensor, thereby achieving a reduction in the manufacturing cost.

The rotary hinge rod torsion unit and the support rib can ensure the stable operation implementation and the performance and toughness of the magnetic sensor.

The same magnetization position is provided through the rotary hinge rod torsion unit to derive a preset output range value so that a separate calibration work is excluded to enhance efficiency.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 14 shows an example of the operating shape of a rotary hinge rod rotating by a lever cooperating unit operating cooperatively in response to the tilting operation of a vehicle gearshift lever and a magnet disposed at the rotary hinge rod before and after the mounting, the positional relationship between the magnet and the magnetic sensor, the rotation angle of the magnet, and the output angle of the magnet sensor;

Figure 1:
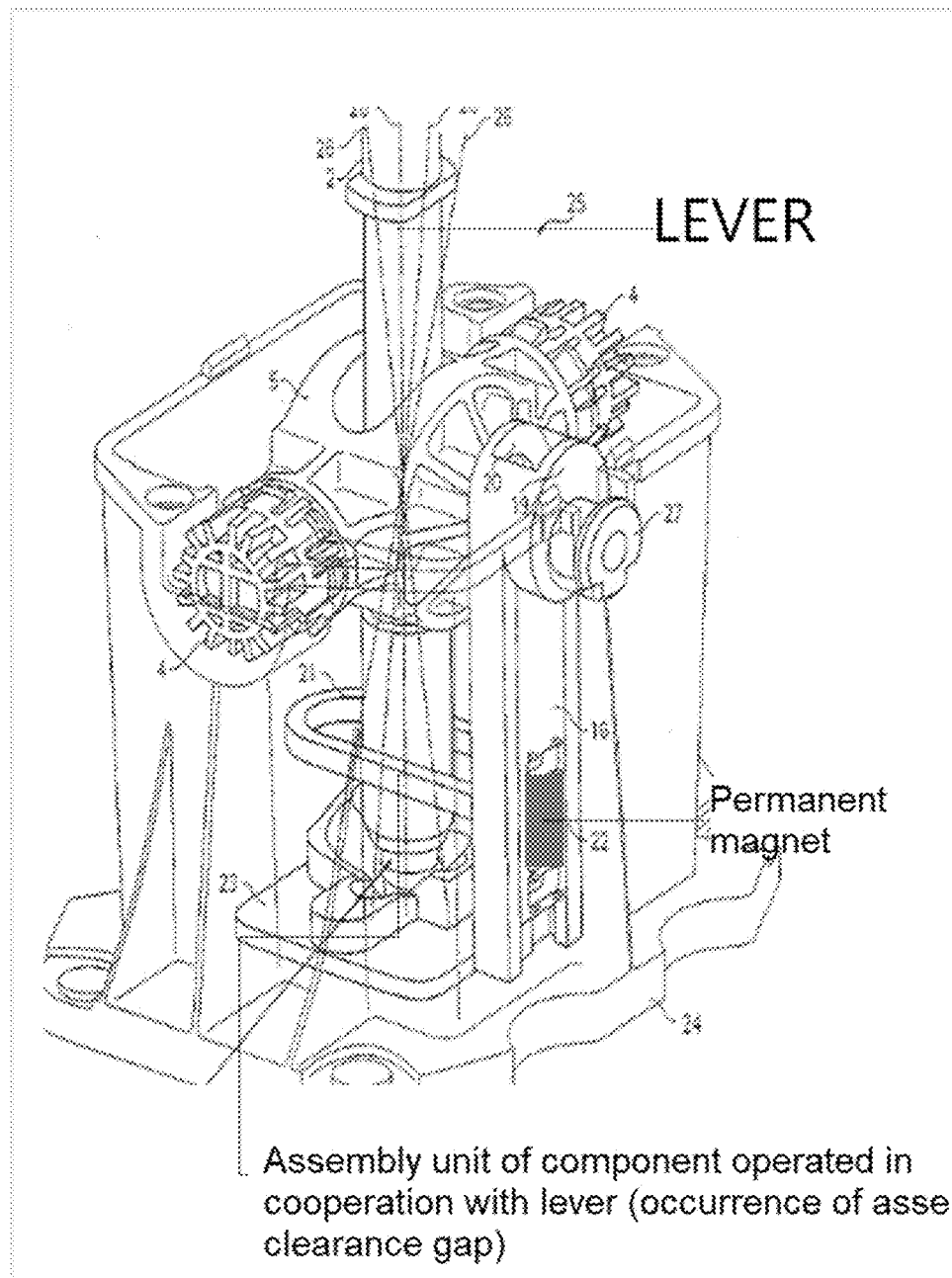
FIG. 1 is a schematic partial perspective view showing a gearshift lever according to the prior art.
Figure 2:
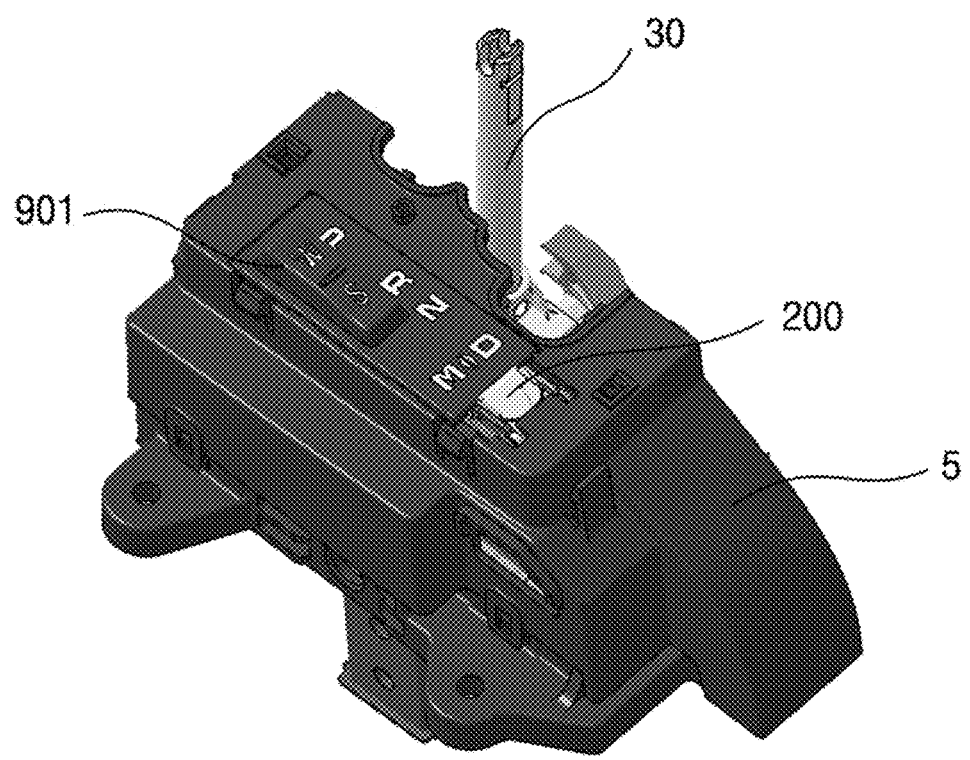
FIGS. 2 and 3 are partial cut-away views showing a mounting state of a shifting range rotary sensing device according to an embodiment of the present invention.
Figure 3:
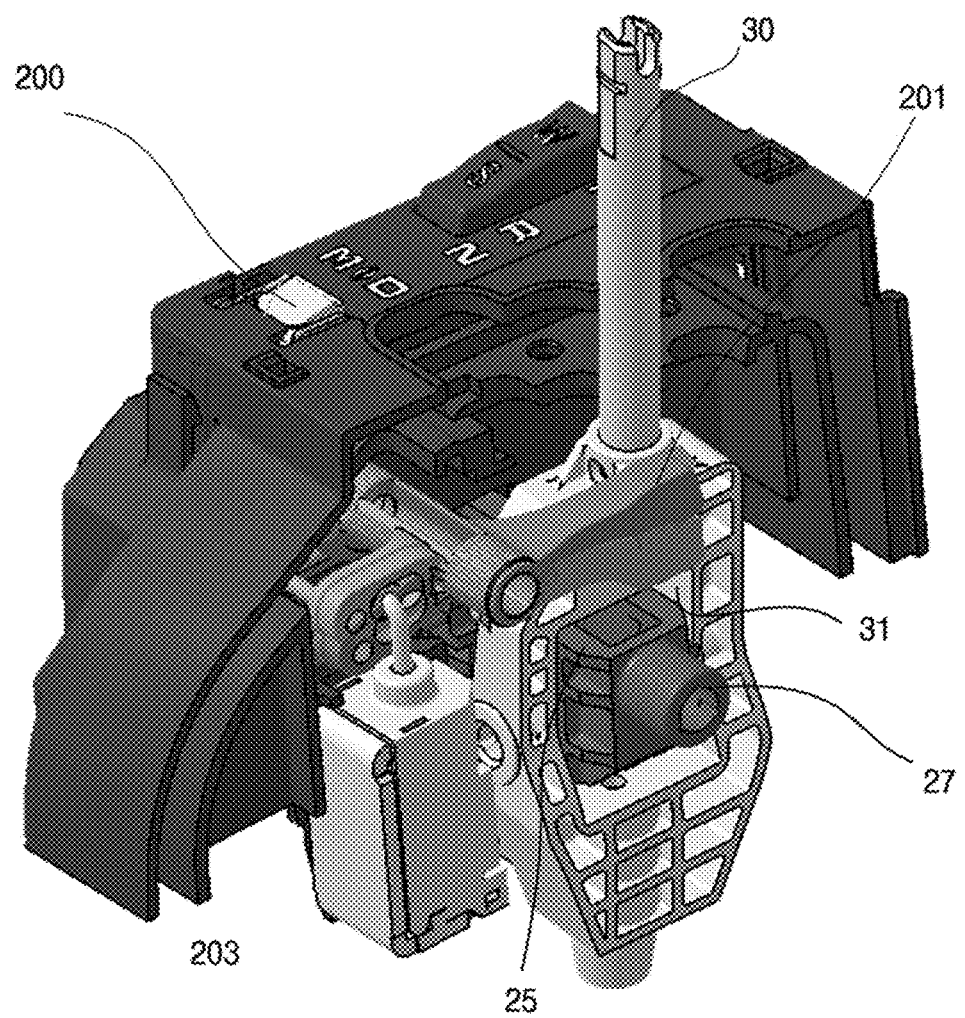
Figure 4:
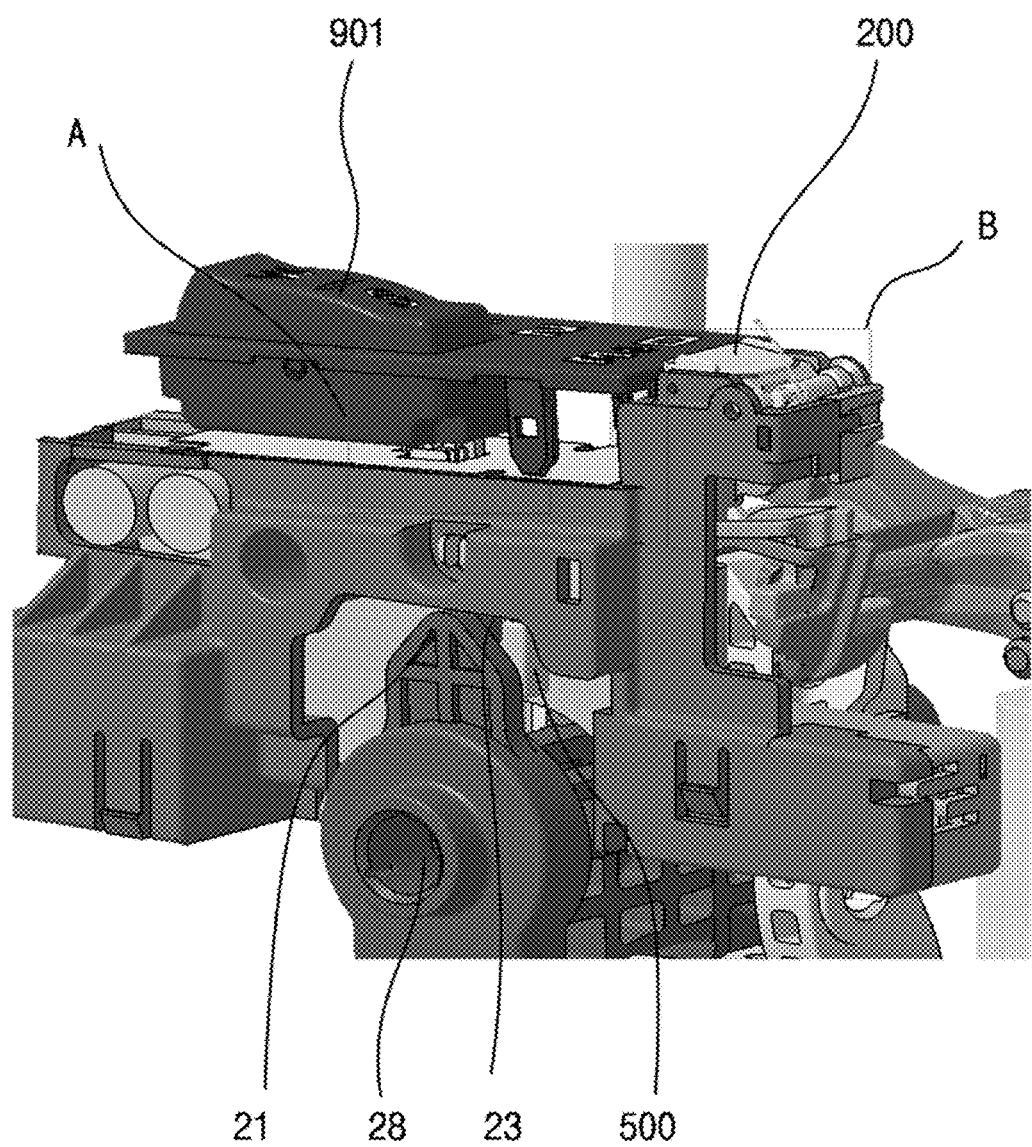
FIGS. 4 to 6 are schematic partial exploded perspective views showing a shifting range rotary sensing device according to an embodiment of the present invention.

| Explanation of Symbols | |
|---|---|
| 10: shifting range rotary sensing device | |
| 100, 800: housing | 100: housing body |
| 800: housing cover | 200: substrate |
| 300: rotary shaft | 600: sensing unit |

DESCRIPTION OF THE PREFERRED EMBODIMENTS

Now, preferred embodiments of the present invention will be described hereinafter in detail with reference to the accompanying drawings. It should be noted that the same elements in the drawings are denoted by the same reference numerals although shown in different figures. In the following description, the detailed description on known function and constructions unnecessarily obscuring the subject matter of the present invention will be avoided hereinafter.

A shifting range rotary sensing device 10 for a vehicle of the present invention, which is a switch device used in the vehicle, such as, for example, various sensing devices for detecting various states of a vehicle or a switching device for selecting various functions of the vehicle. The shifting range rotary sensing device 10 can be used to implement various selective functions for the vehicle, such as controlling the operation states of various electric and electronic devices for the vehicle such as an audio system, a navigator, an air conditioning device and the like, which are installed in the vehicle to enable the implementation of various manipulation states, along with an inhibitor switch, a steering wheel sensor and the like, which are configured to detect various vehicle states through the rotation manipulation thereof. In addition, the shifting range rotary sensing device 10 may be used in a variety of fields in the process of detecting a rotation operation and generating a predetermined detection signal to perform a switching operation, but is implemented as a shifting range sensing switch connected to a gearshift lever to detect a shifting range manipulated and selected by a driver and/or an inhibitor switch connected to a spool (not shown) of a transmission in this embodiment.

The shifting range rotary sensing device 10 of the present invention includes a housing (100, 800), a substrate 400, a rotary shaft 300, and a sensing unit (430, 600).

Figure 16:
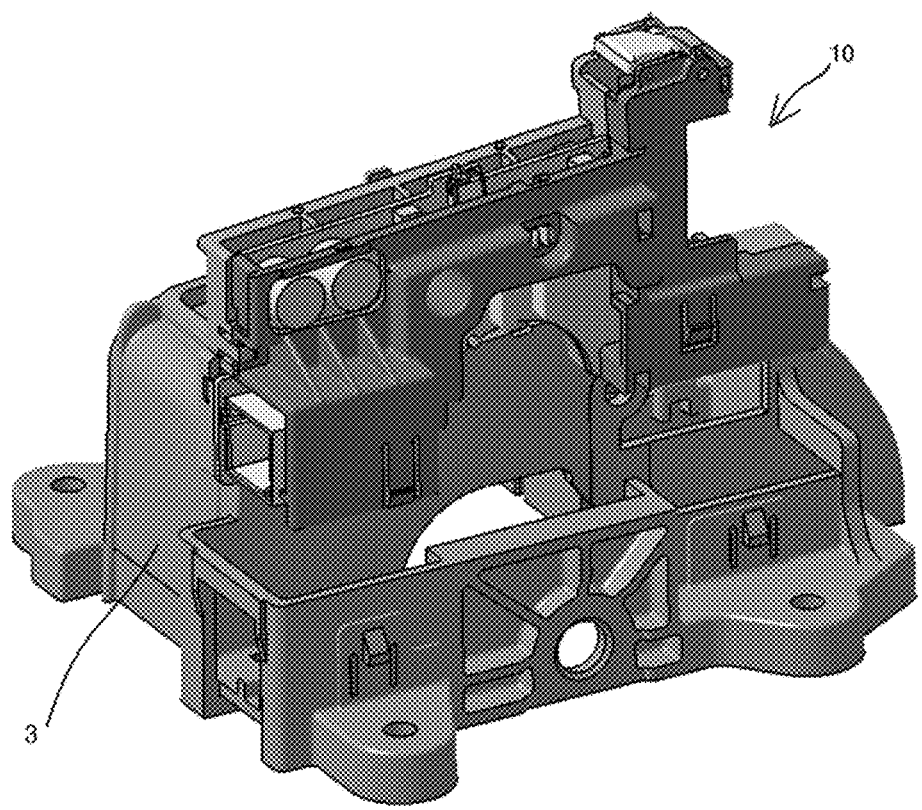
FIGS. 16 to 18 show a perspective view and a partial exploded perspective view, and a partial side view of the mounting state of a shifting range rotary sensing device according to an embodiment of the present invention.
Figure 17:
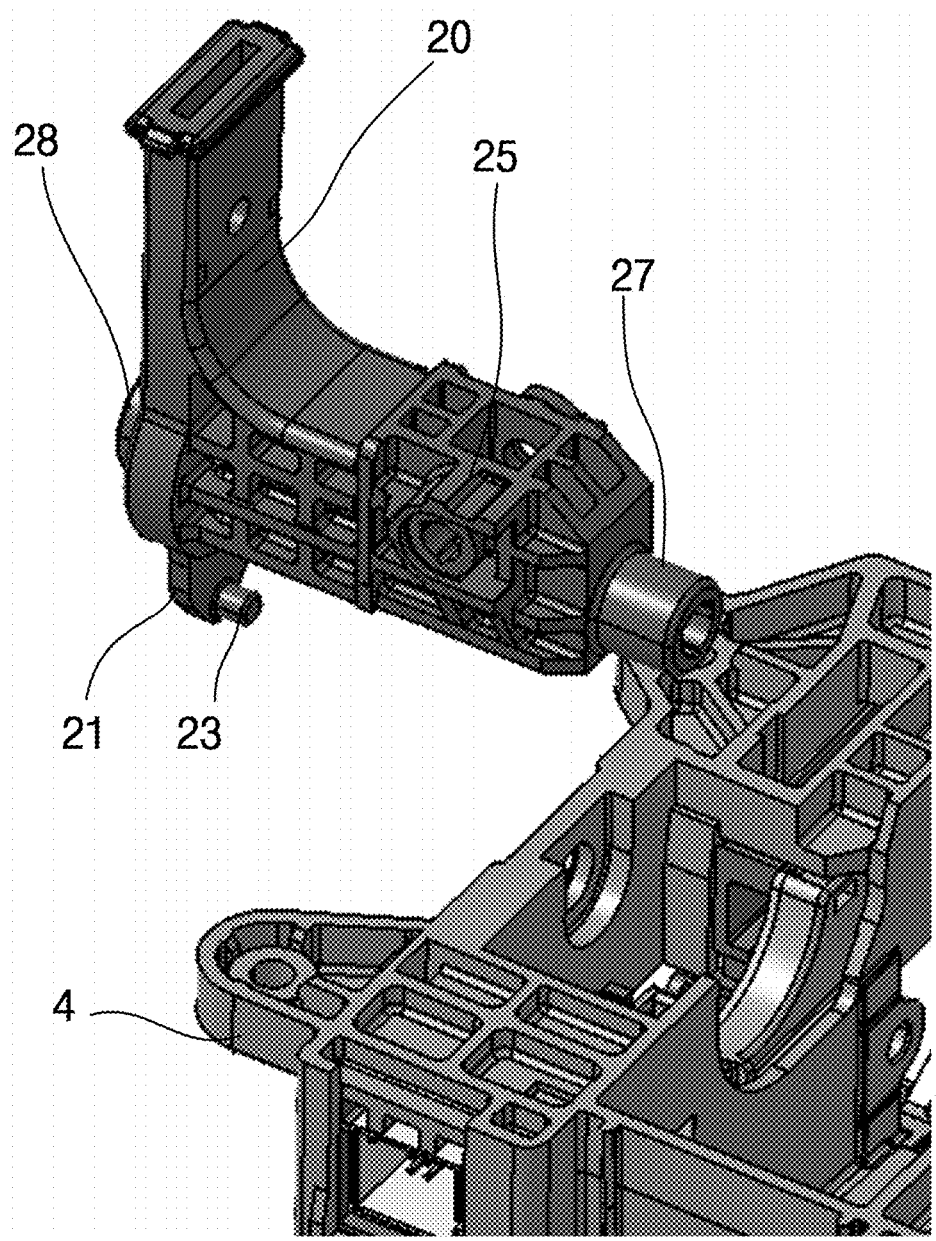
Figure 18:
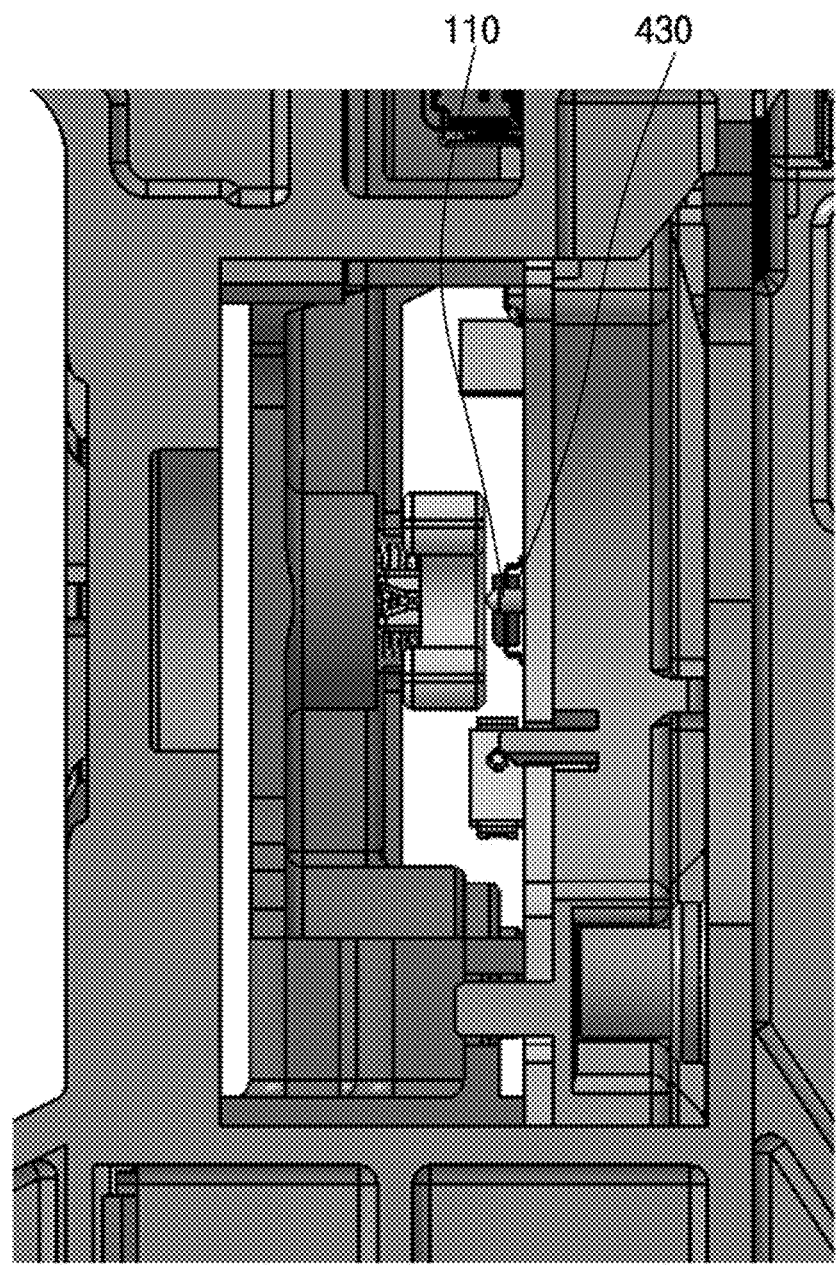

The housing (100, 800) includes a housing body 100 and a housing cover 800. The housing body 100 and the housing cover 800 have a cover coupling part and a body coupling part, which are respectively formed at the sides thereof so that the cover coupling part and the body coupling part are coupled to each other to define an internal space therebetween. The housing (100, 800) is disposed in a module housing 3 (see FIG. 16) in which a gearshift module including a vehicle gearshift lever 30 arranged in a vehicle and a shifting range rotary sensing device 10 is mounted.

A module cover 5 is disposed on a top of the module housing 3 so that a release ratchet 200 can be disposed at the module cover 5. The release ratchet 200 rotates a release lever 201 and a release solenoid 203 is disposed at the release lever 201. The release solenoid 203 may perform or cancel a shift lock function of a gearshift lock function, and a detailed description thereof will be omitted.

Each of the cover coupling part and the body coupling part is implemented as a grooved recess or a through-hole that is formed on the outer circumference, and the cover coupling part and the body coupling part are penetratingly coupled to each other by means of a separate fastening member 101 so that the housing cover 800 and the housing body 100 can define an internal space therebetween to accommodate other elements prevent an unwanted separation and escape.

Figure 9:
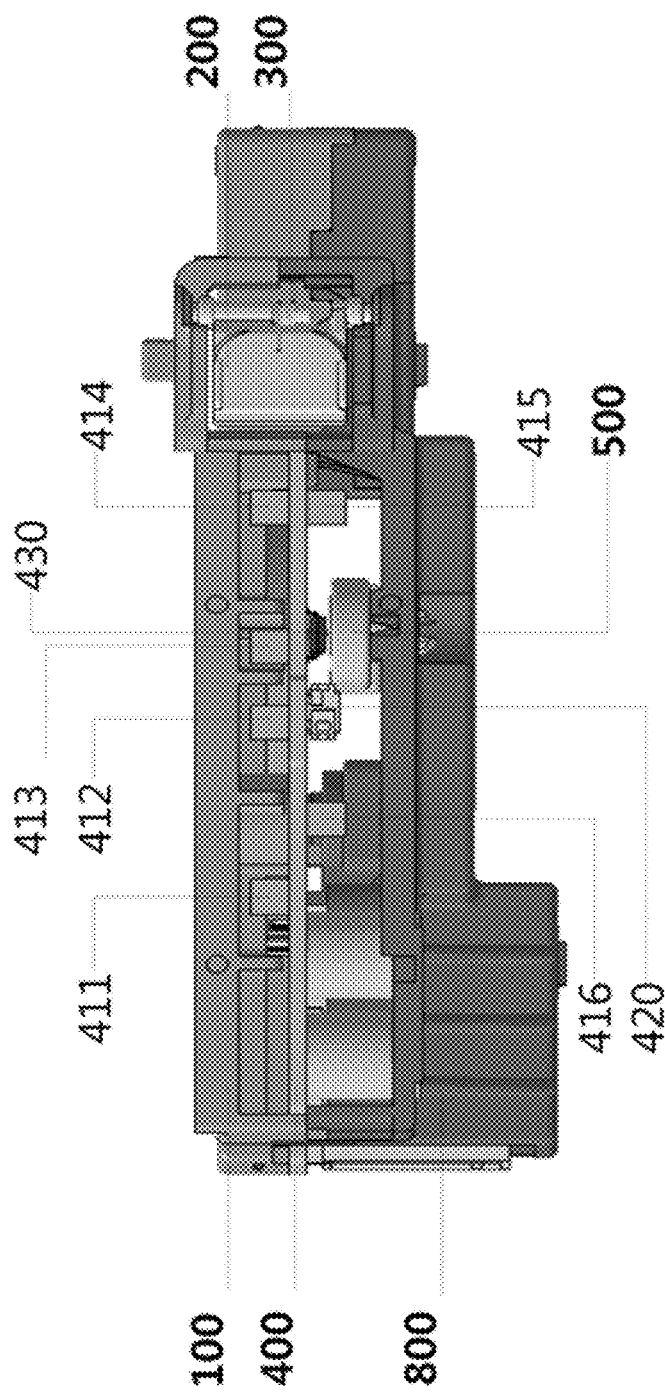
FIGS. 9 and 10 are schematic top plan and front views showing a shifting range rotary sensing device according to an embodiment of the present invention.
Figure 10:
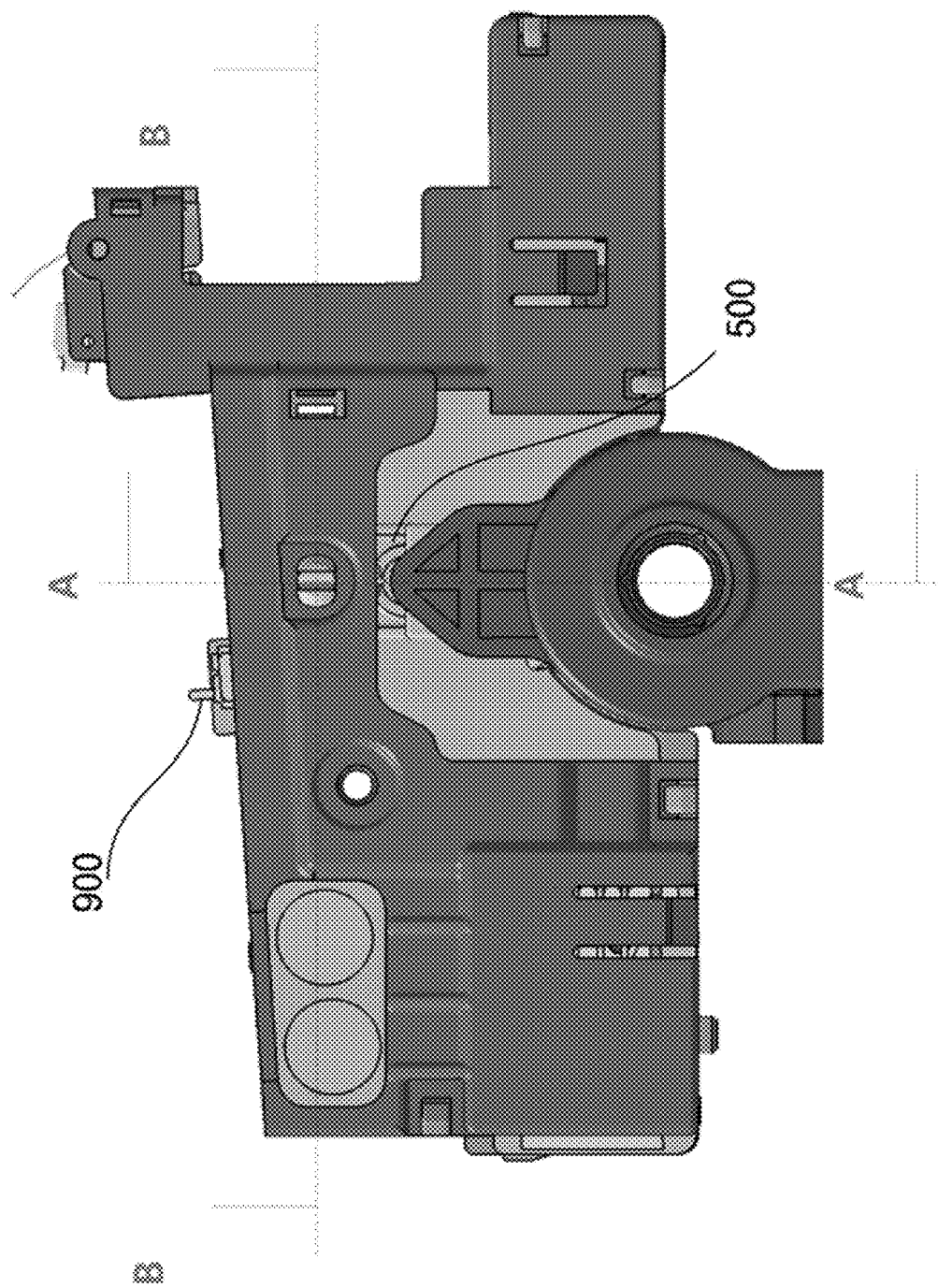
Figure 11:
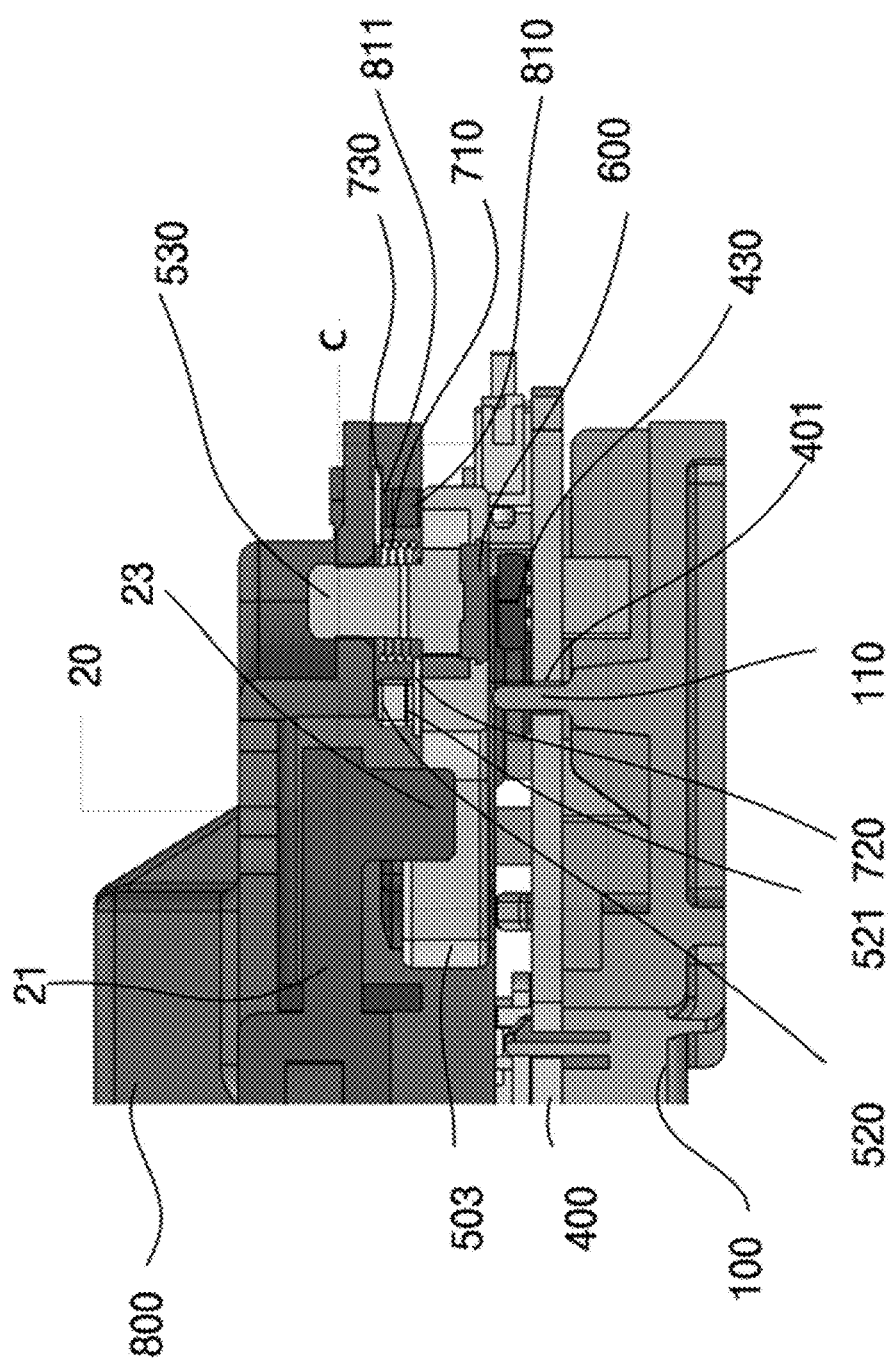
FIGS. 11 to 13 are schematic cross-sectional views showing a shifting range rotary sensing device according to an embodiment of the present invention.
Figure 12:
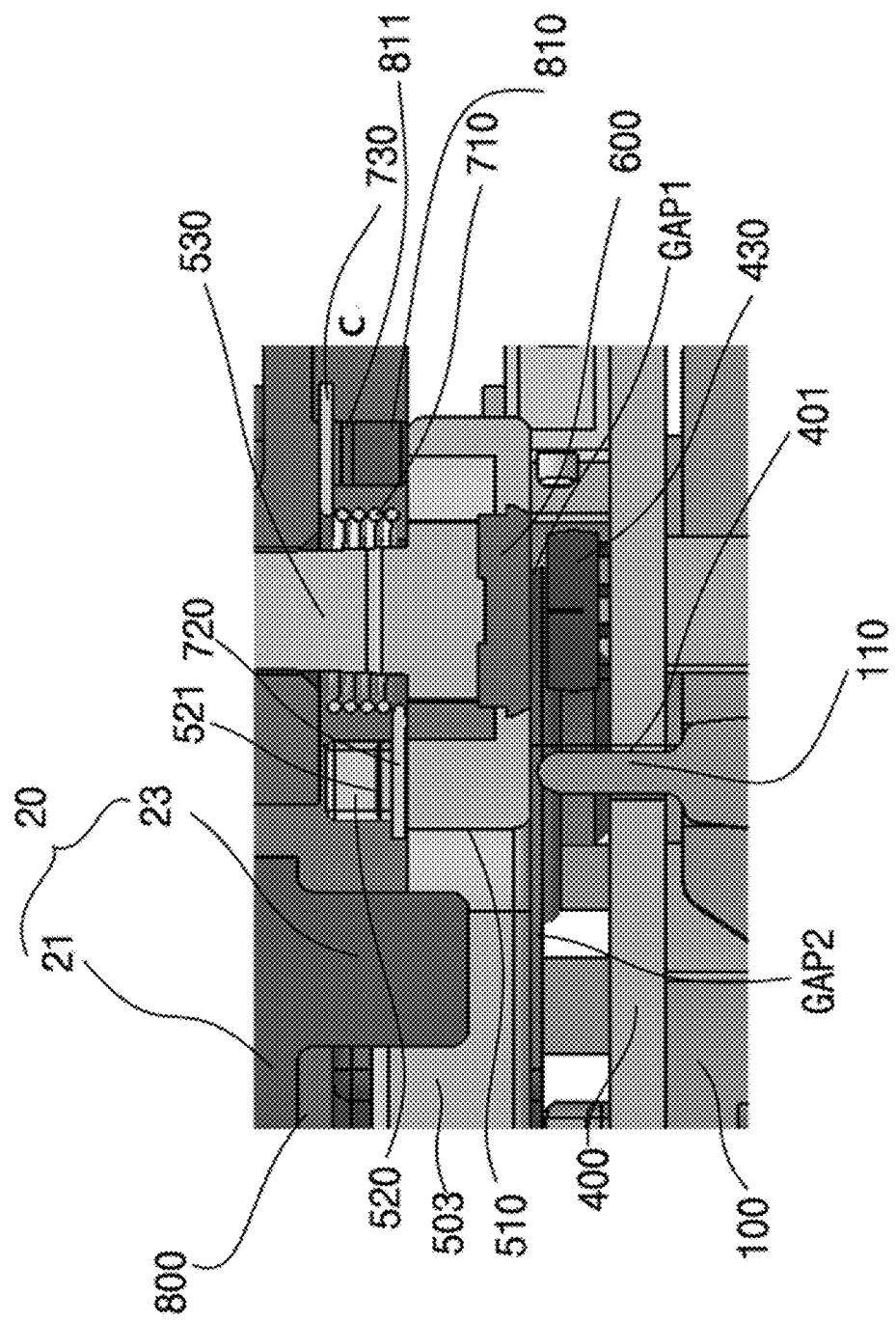
Figure 13:
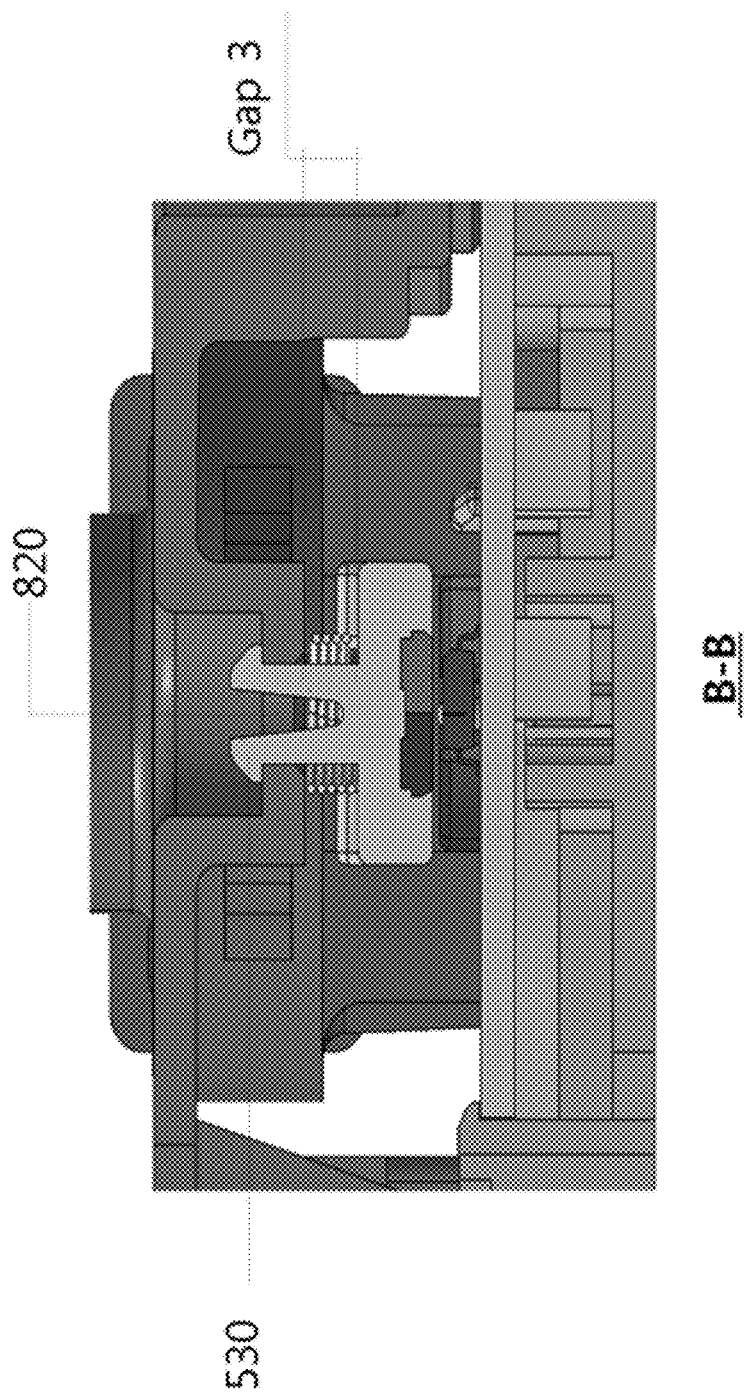

The substrate 400 is accommodated and disposed in the internal space defined by the housing (100, 800). Various electrical devices are disposed on the substrate 400. On one side of the substrate 400 may be disposed gearshift light output parts 411, 412, 413, 414 and 415 (see FIG. 9) for displaying a gearshift state corresponding to a shifting range that is gear-shifted and sensed through a gearshift lever. The gearshift light output part 411, 412, 413, 414 and 415 may include a P gearshift light output part 411 corresponding to a P shifting range, an R gearshift light output part 412, an N gearshift light output part 413, a D gearshift light output part 414, and an M gearshift light output part 415. The gearshift light output part can be configured in various manners depending on gearshift design specifications.

The rotary hinge rod 500 is rotatably disposed within the housing (100, 800). The rotary hinge rod 500 is contactingly connected to a lever cooperating unit 20 operated in cooperation with a vehicle gearshift lever 30. The rotary hinge rod 500 is rotated cooperatively with the vehicle gearshift lever 30 when the vehicle gearshift lever 30 is rotated.

In other words, the housing cover 800 has a cover opening part 801 formed thereon. The rotary hinge rod 500 is exposed to the outside through the cover opening part 801 so as to be connected to the lever cooperating unit 20. Thus, when the gearshift lever is rotated by a driver, a rotational force of the gearshift lever is transmitted to the lever cooperating unit 20, and the rotary hinge rod 500 is rotated cooperatively with the gearshift lever.

A lever cooperating shaft connection part 25 connected to the vehicle gearshift lever 30 is disposed at an end of the lever cooperating unit 20 (see FIGS. 2 to 4 and FIG. 16). A gearshift lever connection part 31 is formed at the vehicle gearshift lever 30 so that the lever cooperating shaft connection part 25 is insertingly disposed within the gearshift lever connection part 31. When the vehicle gearshift lever 30 is tiltingly moved, the lever cooperating unit 20 is also operated in cooperation with the vehicle gearshift lever 30. In this case, lever cooperating unit mounting parts 27 and 28 are provided at both ends of the lever cooperating unit 20, and are rotatably seated on a module seating part formed at the module housing 3 (see FIG. 16) of the vehicle. Thus, the lever cooperating unit 20 forms a structure in which it can be rotate about the lever cooperating unit mounting parts 27 and 28.

In addition, the lever cooperating unit 20 includes a cooperating rib 21 extending downwardly from one side thereof. An end of the cooperating rib 21 is at least partially formed as an end forming an acute angle so that when the lever cooperating unit 20 is rotated, the rotation state of the lever cooperating unit 20 can be sensed visibly.

The cooperating rib 21 can be inserted into a hinge rod rib insertion part 510 defined by the hinge rod body 501 and the hinge rod extension part 503 of the rotary hinge rod 500 which will be described later. More specifically, the cooperating rib 21 has a protrusion 23 formed extending from one side thereof, and the protrusion 23 is inserted into the hinge rod rib insertion part 510 so that a cooperative operation structure between the lever cooperating unit 20 and the rotary hinge rod 500 can be formed, which will be described in detail below.

A predetermined gearshift state detection is achieved by the rotation of the rotary hinge rod 500. This detection is performed by the sensing unit (430, 600). In other words, the sensing unit (430, 600) includes a magnetic sensor 430 and a magnet 600. The magnetic sensor 430 is disposed on the other side of the substrate 400 and senses a predetermined magnetic state in response to a sensing control signal from a controller (not shown). The magnet 600 is disposed at the rotary hinge rod 500 to correspond to the magnetic sensor 430. That is, as described above, when the gearshift lever is rotated by a driver, a rotational force of the gearshift lever is transmitted to the lever cooperating unit 20, and the rotary hinge rod 500 exposed to the outside through the cover opening part 801 and connected to the lever cooperating unit 20 is rotated cooperatively with the gearshift lever. At this time, the magnet 600 disposed at the rotary hinge rod 500 is also rotated together with the rotary hinge rod 500 upon the rotation of the rotary hinge rod 500, and the magnetic sensor 430 disposed at a corresponding position of the magnet 600 senses a changed magnetic environment by the rotation of the magnet 600 so that a predetermined gearshift state detection manipulated by the driver can be performed through a predetermined change state detection.

The shifting range rotary sensing device of the present invention further may include an element for returning the rotary hinge rod 500 to an original position after the rotation of the rotary hinge rod 500. In other words, the shifting range rotary sensing device further includes a rotary hinge rod torsion unit 700. The rotary hinge rod torsion unit 700 is implemented as a coil type torsion spring. The implementation of the torsion spring enables a compact construction of a mounting space. This is merely an example and the type of the rotary hinge rod torsion unit 700 is not limited thereto but is preferably formed as a torsion spring in terms of a spatial configuration.

The rotary hinge rod torsion unit 700 is disposed within the housing (100, 800) in such a manner as to be supportingly contacted at one end thereof with the rotary hinge rod 500 and at the other end thereof with the inside of the housing (100, 800) so as to elastically support the rotary hinge rod 500 when the rotary hinge rod 500 is rotated. That is, although the magnet 600 disposed at the rotary hinge rod 500 is held in position in a state of being rotated or not rotated through the manipulation of the gearshift lever by the driver, the rotary hinge rod 500 forms a state in which a twisted torsion is applied thereto by virtue of the rotary hinge rod torsion unit 700 so that the rotary hinge rod 500 due to a frequent position change of the gearshift lever can minimize or prevent the possibility of occurrence of hysteresis, i.e., a shifting range detection error occurring by occupying a changed rotation position with a clearance without occupying a preset rotation position. In addition, the same magnetization position can be set so that a separate calibration work for adjusting the output range can be excluded to significantly increase the assemblability.

More specifically, the lever cooperating unit 20 includes a cooperating rib 21 extending downwardly from one side thereof. The rotary hinge rod 500 includes a hinge rod mounting part 530, a hinge rod body 501, and a hinge rod extension part 503. In this embodiment, the rotary hinge rod 500 is formed in a U-shape, and the hinge rod mounting part 530 is formed on one surface of the hinge rod body 501 and the hinge rod extension part 503 is formed on one side of the hinge rod body 501.

In other words, the hinge rod mounting part 530 is rotatably engaged to a housing cover rod mounting part 820 formed at the housing cover 800. The hinge rod body 501 forms a body of the rotary hinge rod 500 and the hinge rod mounting part 530 is formed on one surface of the hinge rod body 501. The hinge rod extension part 503 extends downwardly from the hinge rod body 501. The hinge rod extension part 503 has an end portion formed in a U-shape so that a space defined between the hinge rod extension part 503 forms a hinge rod rib insertion part 510 and the cooperating rib 21 is accommodated in the hinge rod rib insertion part 510.

In the meantime, the hinge rod body 501 includes a rod body magnet accommodating part 502 formed therein. The magnet 600 is accommodated in the rod body magnet accommodating part 502 as described above so that when the hinge rod body 501 is rotated, the magnet 600 accommodated in the rod body magnet accommodating part 502 is rotated together with the hinge rod body 501. The rod body magnet accommodating part 502 is positioned at the rotational center of the rotary hinge rod to cause the magnet 600 to be disposed at the rotational center of the rotary hinge rod to form the rod body magnet accommodating part 502 at the rotational center of the lever cooperating unit so that a gearshift state over the entire section range can be detected by a single magnetic sensor, thereby achieving a reduction in the manufacturing cost.

The magnetic sensor 430 of the sensing unit, which is disposed at a corresponding position of the magnet 600 accommodated in the rod body magnet accommodating part 502, detects a preset shifting range including one or more of P(parking), D(driving), R(rearward moving), and N(neutral shifting) of the vehicle, and a buffer range is provided between at least two adjacent shifting ranges of the preset shifting range detected by the magnetic sensor 430 of the sensing unit. In other words, the sensing regions detected by the magnetic sensor 430, which correspond to P(parking), D(driving), R(rearward moving), and N(neutral shifting) as the shifting ranges of the vehicle, are not crossingly formed but separately formed with respect to each shifting range, and the buffer range is disposed between two adjacent sensing regions corresponding to respective shifting ranges so that the possibility of occurrence of a safety accident due to frequent signal change at boundary regions can be prevented.

In the meantime, the rotary hinge rod torsion unit 700 includes a torsion coil part 710, a torsion coil rod support part 720, and a torsion coil cover support part 730. The torsion coil part 710 takes a configuration in which the hinge rod mounting part 530 penetrates through the torsion coil part 710 so that the torsion coil part 710 is disposed on the outer circumference of an at least portion of the hinge rod mounting part 530.

The torsion coil rod support part 720 is supported by a hinge rod torsion support part 520 extending from the hinge rod body 501 at its one end connected to the torsion coil part 710.

The torsion coil cover support part 730 is supported by a cover torsion support part 810 extending from the housing cover 800 at its the other end connected to the torsion coil part 710.

By virtue of this configuration, the rotary hinge rod torsion unit 700 implemented as a torsion spring can provide a predetermined elastic support force to the rotary hinge rod 500.

A hinge rod torsion support groove 521 is formed at the hinge rod torsion support part 520 to allow the torsion coil rod support part 720 to be insertingly disposed therein.

In addition, a cover torsion support groove 811 is formed at the cover torsion support part 810 to allow the torsion coil cover support part 730 to be insertingly disposed therein.

A connector 403 is mounted on the substrate 400 so that an electrical connection with an external device, such as for example, ECU, TCU or the like can be established through the connector 403.

The substrate 400 includes a through-hole 401 formed therein. In addition, the housing body 100 includes a support rib 110. The support rib 110 penetrates through the through-hole 401 formed on the housing body 100. The support rib 110 extends protruding from one side of the hinge rod body 501 to an opposing side of the hinge rod mounting part 530 to maintain a gap between the hinge rod body 501 and the substrate 400. In other words, the magnetic sensor 430 and the magnet 600 form a gap indicated by a reference symbol Gap1 in the case of a reference shape. Even in the case where a position change occurs in the magnetic sensor 430 and the magnet 600, a gap indicated by a reference symbol Gap2 can be maintained as a minimum gap in the case of a Gap reference shape which is a minimum gap reference.

Figure 5:
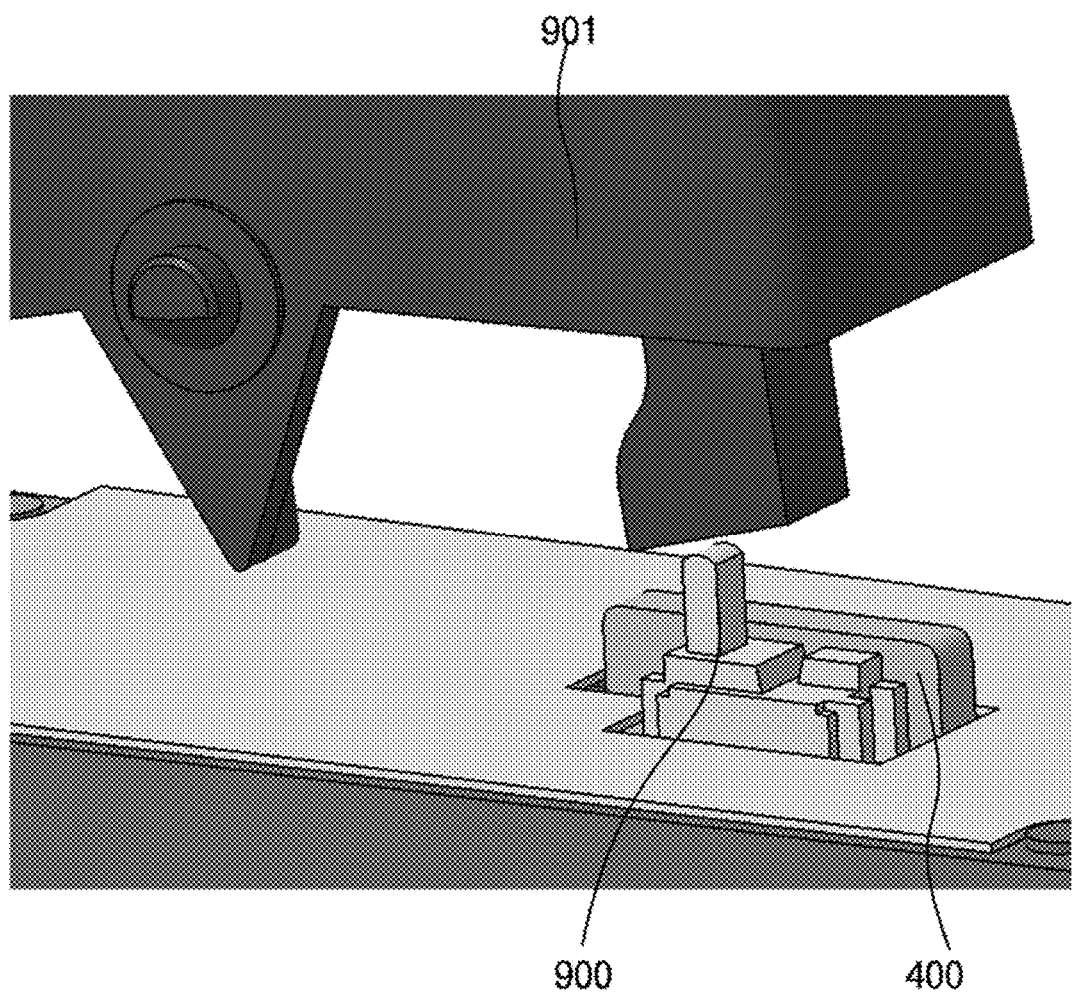
Figure 6:
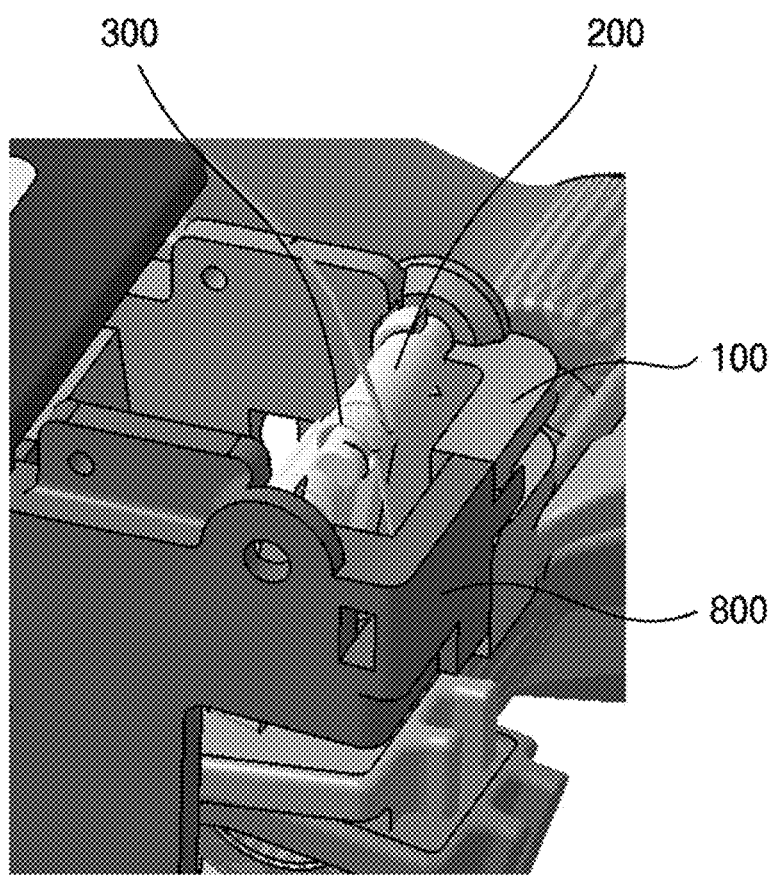
Figure 7:
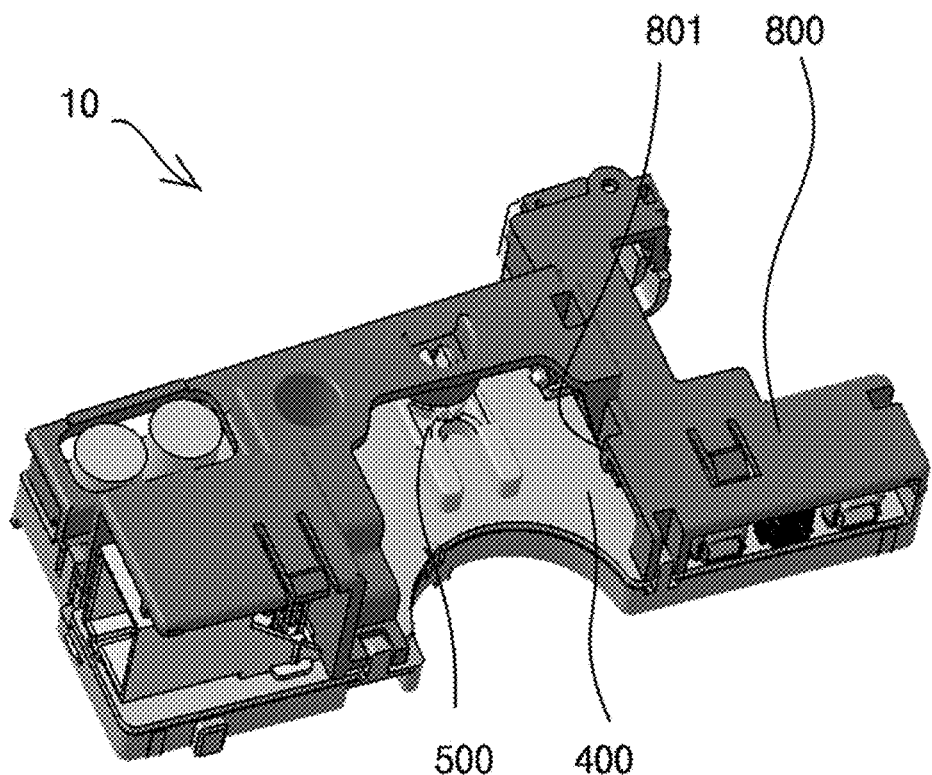
FIG. 7 is a schematic bottom perspective view showing a shifting range rotary sensing device according to an embodiment of the present invention.
Figure 8:
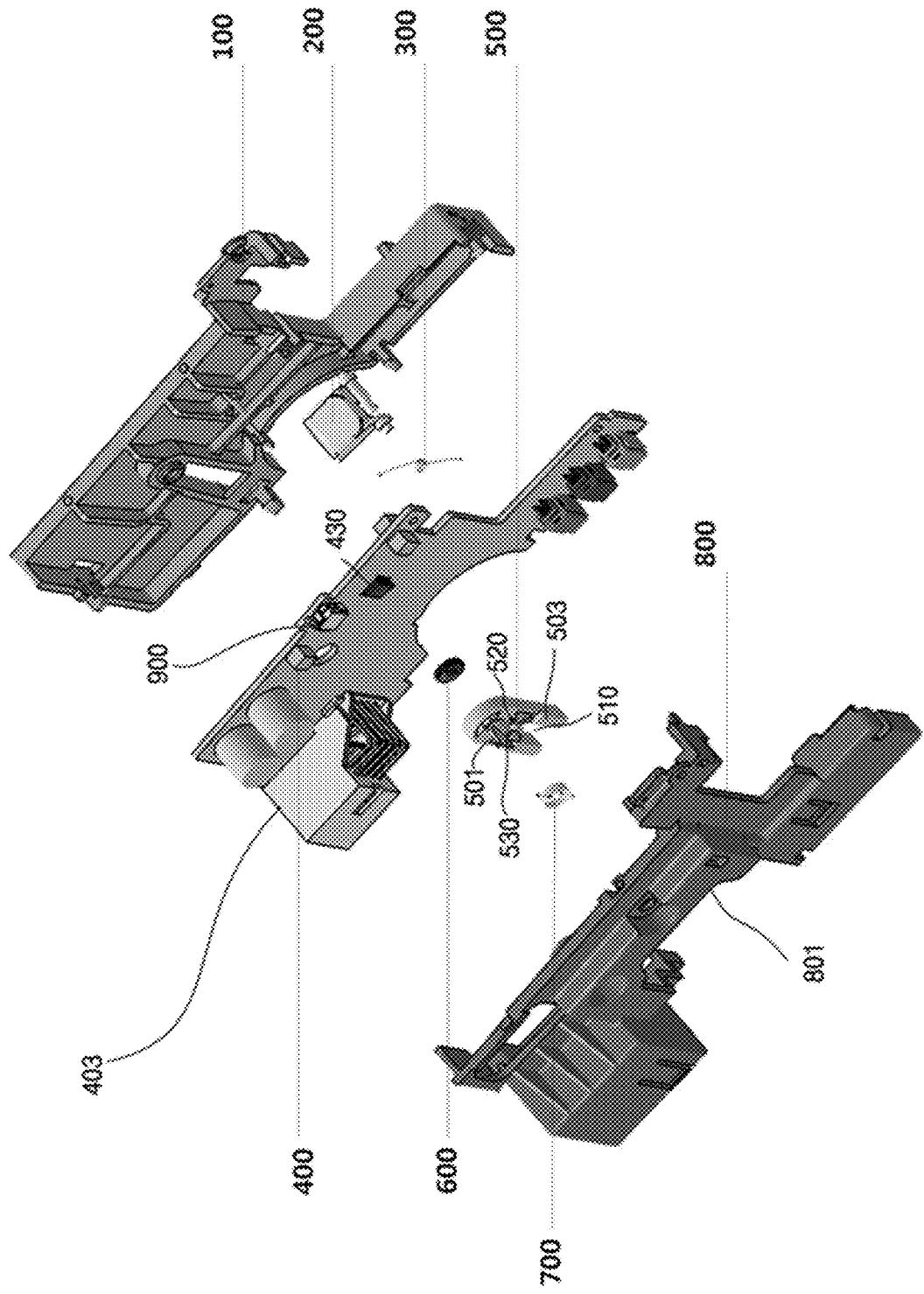
FIG. 8 is a schematic exploded perspective view showing a shifting range rotary sensing device according to an embodiment of the present invention.

Meanwhile, the shifting range rotary sensing device 10 may further include a driving mode switch 900. That is, the driving mode switch 900 may be disposed on the substrate 400 and a driving mode switch knob 901 (see FIGS. 2, 4 and 5) may be rotatably mounted on the module cover 5 disposed on the top of the module housing 3.

The driving mode switch 900 is a switch that allows a user to select a driving mode of the vehicle through its manipulation by the user. A driver can select a driving mode for each driving state, such as, for example, an S mode required in a typical driving state, a W mode required for startup and departure in a driving state or on a snowy road during the winter season, etc., through the driving mode switch 900. A driving mode switch signal inputted through the driving mode switch 900 is transferred to a controller (not shown) which in turn can perform a shifting range or a shifting control of the vehicle based on the input signals and the preset data stored in a storage unit (not shown).

Hereinafter, the operation process or state of the shifting range rotary sensing device 10 of the present invention will be described with reference the accompanying drawings.

FIG. 14 shows an example of the operating shape of a rotary hinge rod 500 rotating by a lever cooperating unit operating cooperatively in response to the tilting operation of a vehicle gearshift lever 30 and a magnet 600 disposed at the rotary hinge rod before and after the mounting, the positional relationship between the magnet 600 and the magnetic sensor 430, the rotation angle of the magnet 600, and the output angle of the magnet sensor 430.

The vehicle gearshift lever 30 forms the angular states of α1, α2, α4, α5 and α3 as the respective rotating angles of the lever cooperating unit 20 with respect to P(parking), R(rearward moving), N(neutral shifting), and D(driving) shifting ranges and a state before mounting depending on the tilting position thereof. In this case, the position and shape between the magnet 600 and the magnetic sensor 430 and β1, β2, β4, β5 and β3 as the rotation angles of the magnet 600 occur between the magnet 600 and the magnetic sensor 430. At this time, the sensor output rotation angles detected and calculated by the magnetic sensor 430 have the output angles of γ1, γ2, γ4, γ5 and γ3.

Figure 15:
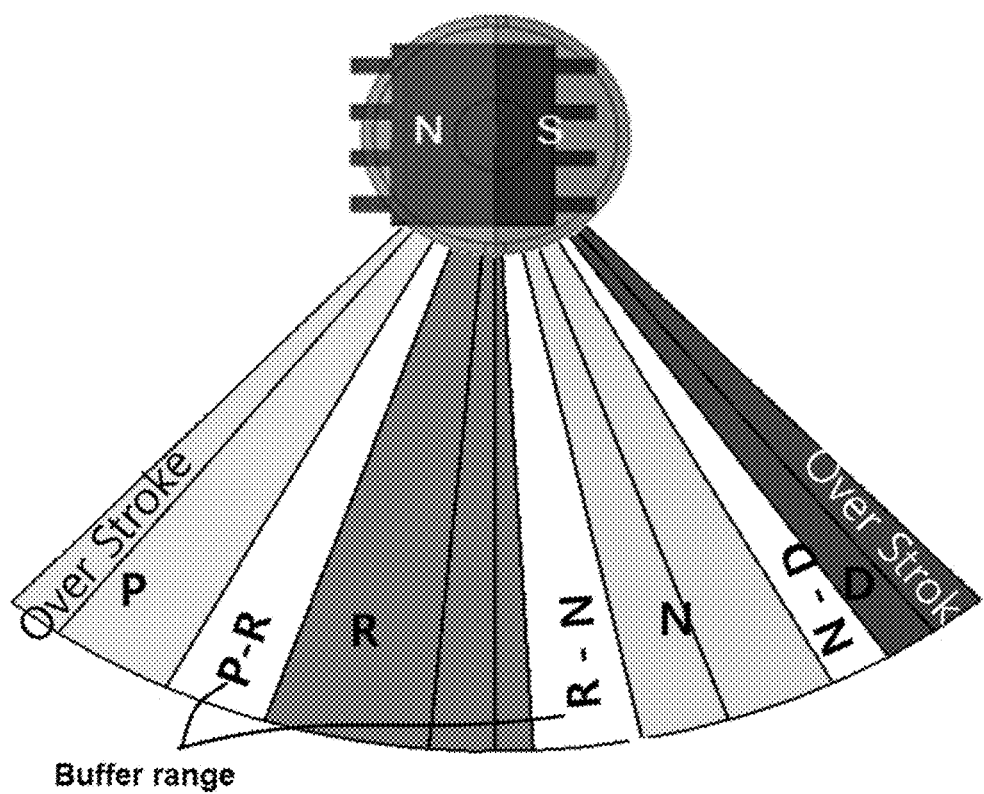
FIG. 15 is a view showing the angular range of a shifting range according to the rotation of a vehicle gearshift lever.

The angular range of a shifting range according to the rotation of a vehicle gearshift lever 30 is shown in FIG. 15. In other words, FIG. 15 shows a configuration of a vehicle shifting range according to the positional relationship between the magnet 600 and the magnetic sensor 430. Buffer ranges are present between P(parking), R(rearward moving), N(neutral shifting), and D(driving) shifting ranges as described above so that the possibility of occurrence of a vehicle safety accident due to frequent signal change at boundary regions representing specific shifting ranges can be prevented.

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical sprit of the appended claims.

What is claimed is:

1. A shifting range rotary sensing device for a vehicle, comprising:
   a housing (100, 800);
   a substrate (400) accommodated and disposed in the housing (100, 800);
   a rotary hinge rod (500) rotatably disposed within the housing (100, 800) and contactingly connected to a lever cooperating unit (20) operated in cooperation with a vehicle gearshift lever (30) so that the rotary hinge rod (500) is rotated cooperatively with the vehicle gearshift lever (30) when the vehicle gearshift lever (30) is rotated;
   a sensing unit (430, 600) comprising a magnetic sensor (430) disposed on the substrate (400) and a magnet (600) disposed at the rotary hinge rod (500) to correspond to the magnetic sensor (430); and
   a rotary hinge rod torsion unit (700) disposed within the housing (100, 800) in such a manner as to be supportingly contacted at one end thereof with the rotary hinge rod (500) and at the other end thereof with the inside of the housing (100, 800) so as to elastically support the rotary hinge rod (500) when the rotary hinge rod (500) is rotated.

2. The shifting range rotary sensing device according to claim 1, wherein the housing (100, 800) comprises:
   a housing body (100) disposed in the vehicle; and
   a housing cover (800) engagingly coupled to the housing body (100),
   wherein the housing cover (800) has a cover opening part (801) formed thereon, and
   wherein the rotary hinge rod (500) is exposed to the outside through the cover opening part (801) so as to be connected to the lever cooperating unit (20).

3. The shifting range rotary sensing device according to claim 2, wherein the lever cooperating unit (20) comprises a cooperating rib (21) extending downwardly from one side thereof, and
   wherein the rotary hinge rod (500) comprises:
   a hinge rod mounting part (530) rotatably engaged to a housing cover rod mounting part (820) formed at the housing cover (800);
   a hinge rod body (501) connected to the hinge rod mounting part (530); and
   a hinge rod extension part (503) extending downwardly from the hinge rod body (501) and including a hinge rod rib insertion part (510) defined therebetween to accommodate the cooperating rib (21) therein.

4. The shifting range rotary sensing device according to claim 3, wherein the hinge rod body (501) comprises a rod body magnet accommodating part (502) formed therein to allow the magnet (600) to be accommodated therein.

5. The shifting range rotary sensing device according to claim 4, wherein the sensing unit detects a preset shifting range including one or more of P(parking), D(driving), R(rearward moving), and N(neutral shifting) of the vehicle, and
   wherein a buffer range is provided between at least two adjacent shifting ranges of the preset shifting range.

6. The shifting range rotary sensing device according to claim 5, wherein the rotary hinge rod torsion unit (700) is implemented as a torsion spring.

7. The shifting range rotary sensing device according to claim 6 wherein the rotary hinge rod torsion unit (700) comprises:
   a torsion coil part (710) configured to allow the hinge rod mounting part (530) to penetrate therethrough;
   a torsion coil rod support part (720) supported by a hinge rod torsion support part (520) extending from the hinge rod body (501) at its one end connected to the torsion coil part (710); and
   a torsion coil cover support part (730) supported by a cover torsion support part (810) extending from the housing cover (800) at its other end connected to the torsion coil part (710).

8. The shifting range rotary sensing device according to claim 7, wherein the hinge rod torsion support part (520) comprises a hinge rod torsion support groove (521) formed thereon to allow the torsion coil rod support part (720) to be insertingly disposed therein; and
   wherein the cover torsion support part (810) comprises a cover torsion support groove (811) formed thereon to allow the torsion coil cover support part (730) to be insertingly disposed therein.

9. The shifting range rotary sensing device according to claim 7, wherein the substrate (400) comprises a through-hole (401) formed therein, and wherein the housing body (100) comprises a support rib (110) extending protruding from one side of the hinge rod body (501) to an opposing side of the hinge rod mounting part (530) while penetrating through the through-hole (401) to maintain a gap between the hinge rod body (501) and the substrate (400).

10. The shifting range rotary sensing device according to claim 1, further comprising a driving mode switch (900) disposed on the substrate (400) and configured to allow a user to select a driving mode of the vehicle through its manipulation by the user.

* * * * *